April 26, 1966  A. P. STEWART, JR  3,248,226
METHODS FOR INCREASING THE SOLUBILITY OF POWDERED
MATERIAL AND PRODUCTS RESULTING THEREFROM
Filed Sept. 28, 1964  4 Sheets-Sheet 1

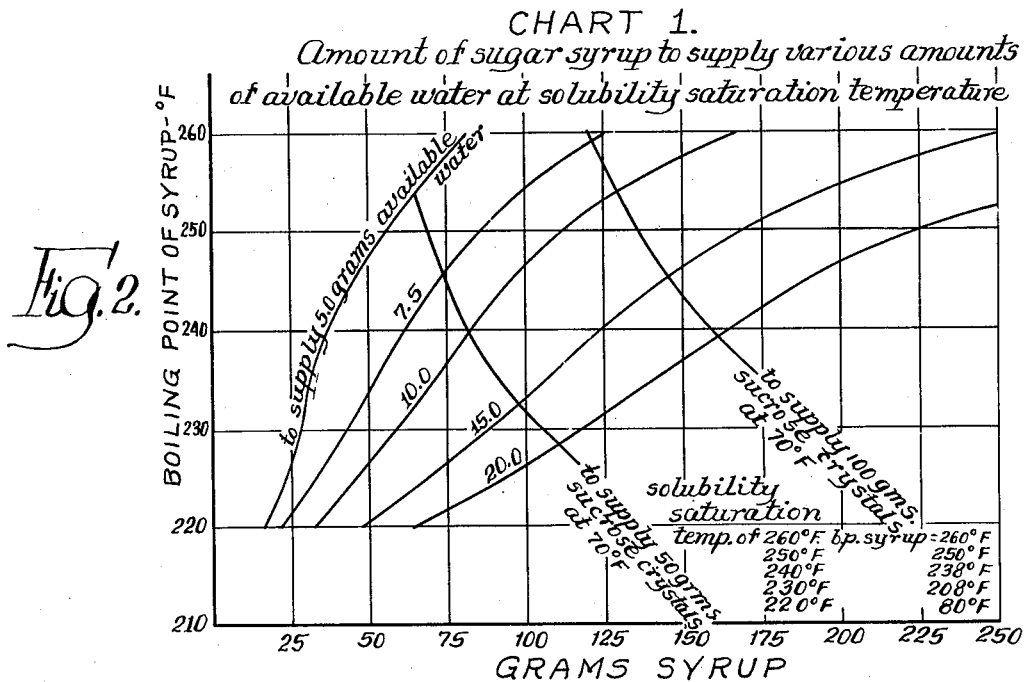
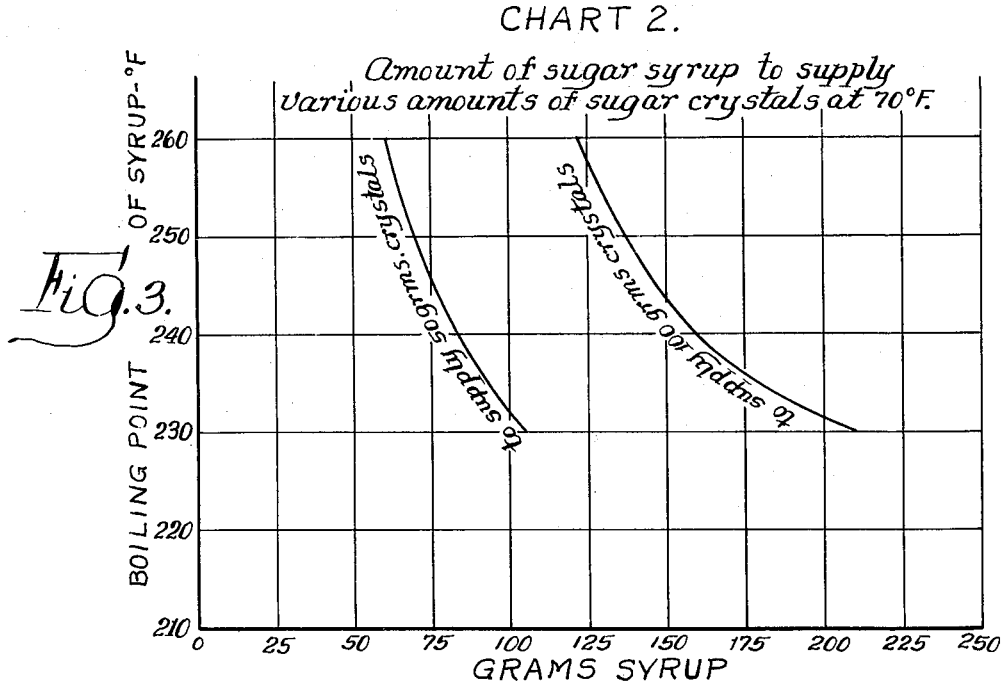

CHART 3.

CHART 4.

April 26, 1966    A. P. STEWART, JR    3,248,226
METHODS FOR INCREASING THE SOLUBILITY OF POWDERED
MATERIAL AND PRODUCTS RESULTING THEREFROM
Filed Sept. 28, 1964    4 Sheets-Sheet 4

CHART 5.

CHART 7.

United States Patent Office 3,248,226
Patented Apr. 26, 1966

3,248,226
METHODS FOR INCREASING THE SOLUBILITY OF POWDERED MATERIAL AND PRODUCTS RESULTING THEREFROM
Aubrey P. Stewart, Jr., 801 Grove Ave., Corning, Iowa
Filed Sept. 28, 1964, Ser. No. 399,701
8 Claims. (Cl. 99—26)

This application is a continuation-in-part of my copending application Serial No. 165,828 filed January 12, 1962, and now abandoned.

This invention relates to methods for rendering soluble powdery material and, more particularly, methods for increasing the size and solubility, and enhancing other characteristics of such material, and the products resulting from the practice of such processes.

It is the general object of the present invention to produce new and improved methods and products for treating powdery materials.

It is a more specific object of the present invention to produce a new and novel process for rendering powdery material, such as powdered milk, more soluble and also to render such powdered milk substantially non-hygroscopic.

Flavored powdered milk products have been offered for sale in increasing volume in recent years. Many of these products comprise a skim milk powder together with a flavoring so that when mixed with water, a flavored skim milk drink is obtained. Other products contain a larger proportion of flavoring and are designed to be added to milk or skim milk to provide a flavored milk drink. The most popular flavor appears to be chocolate, with sugar, salt and miscellaneous ingredients such as vegetable gum for thickening added to the product to enhance its usability.

Until relatively recently, it was customary merely to dry-blend the skim milk powder, cocoa, sugar, salt and other ingredients and package the mixture for sale. Such a mixture, however, tended to stratify in shipment and storage, the stratification being the result of the difference in particle sizes and densities of the ingredients. Additionally, after a package containing such material was opened, the mixture had a tendency to cake on exposure to the atmosphere because of the hygroscopic nature of some of the ingredients. Furthermore, because of the powder form of the skim milk and cocoa, the product would lump when mixed with water and would reconstitute only after a relatively large amount of agitation.

In more recent years, however, methods have been found for producing a so-called "instant" skim milk powder, that is, a skim milk powder which may or may not contain flavoring and other ingredients which will dissolve relatively easily and without the agitation that was theretofore required. Such methods rely upon agglomerating spray dried powder at a relatively high moisture content, at which moisture content the powder is sticky. With sticky powders, the same has a tendency to agglomerate and when the moisture is finally removed, the result is a relatively porous particle having a size many times the size of the powder grains. As an example, the Sharp et al. U.S. Patent 2,921,857 describes a process in which lactose seeded milk concentrate is spray dried to 10% to 18% moisture and agglomerated while the powder is still wet, together with a final drying process. In the Peebles Patent 2,835,586, skim milk powder is moistened to increase its moisture content and allowed to agglomerate and then the agglomerated powder is redried.

The foregoing processes serve to provide a form of skim milk powders wherein the powder is agglomerated into particles of such size that lumping is minimized when mixed with water. Additionally, some non-hygroscopic characteristics are introduced presumably from the lesser surface area exposed in relation to the weight of the powder.

In previous processes, however, the skim milk powder is held at a relatively high moisture content and is dried with heat to the final desired moisture content. Since milk powder is quite sensitive to protein destabilization and insolubility at 10% to 20% moisture content, especially when heated, the time and temperature must be controlled very carefully in order not to exceed the point where such undesired effects would occur, and it has been my observation that some insoluble protein development does occur in the above processes even under the most carefully controlled conditions.

The foregoing processes for producing "instant" milk yield, as indicated before, a rather porous, somewhat fluffy particle. Such particle is of low density and requires a relatively large package to contain a given weight of material.

A further object, therefore, of the present invention is to produce a flavored powdered milk product which, when mixed with water, will reconstitute easily and without lumping, prepared by a process which endangers neither the flavor nor the protein content, and which is non-hygroscopic, free flowing, and possesses a relatively high density in addition to exhibiting excellent qualities of flavor retention on storage.

Inasmuch as the process of the present invention may be utilized to pelletize, or "instantize" as it is sometimes called, many different types of powders, and as binders other than sugar can be utilized, it is a more general object of the invention to produce a process (and the products resulting therefrom) for pelletizing powders of various kinds through the utilization of crystallizable binders.

Other and further objects and advantages of the present invention will become readily apparent from the following detailed description and the accomapnying drawings, in which:

FIG. 2 is a chart showing the amount of sugar syrup needed to supply various amounts of available water at solubility saturation temperature;

FIG. 3 is a chart showing the amount of sugar syrup of various boiling points needed to supply various amounts of sugar crystals at 70° F.;

Figure 1:
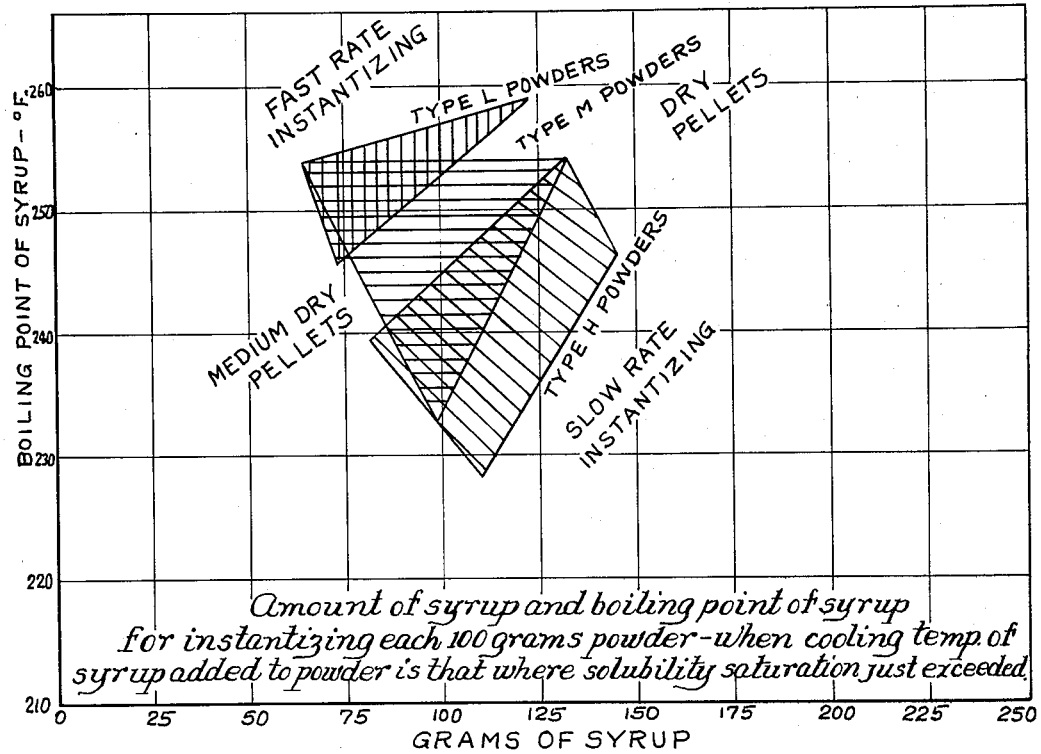
FIG. 1 is a chart showing the amount of syrup and boiling point of syrup for instantizing powders of various properties.
Figure 4:
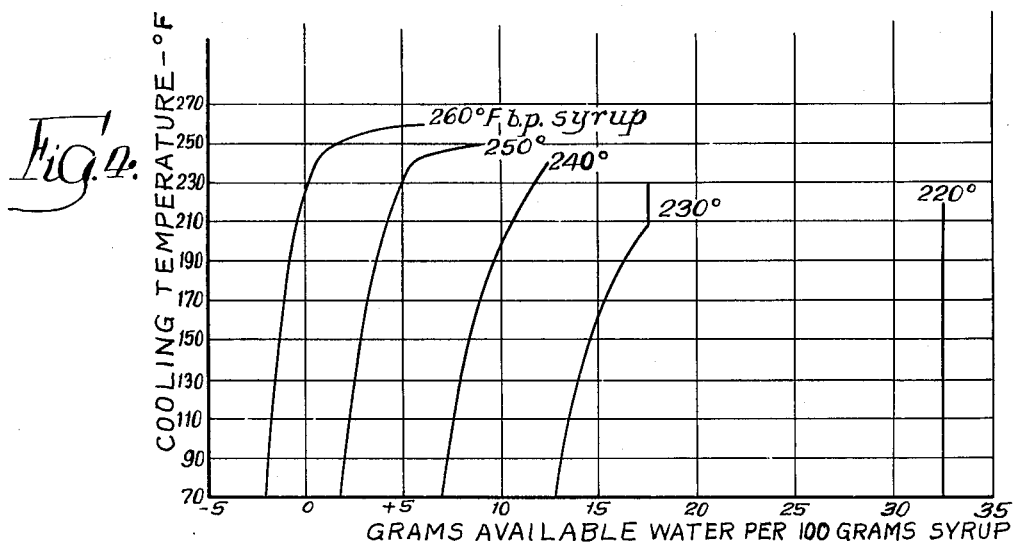
FIG. 4 is a chart showing the amount of available water per 100 grams of syrup of various boiling points and cooling temperatures.
Figure 5:
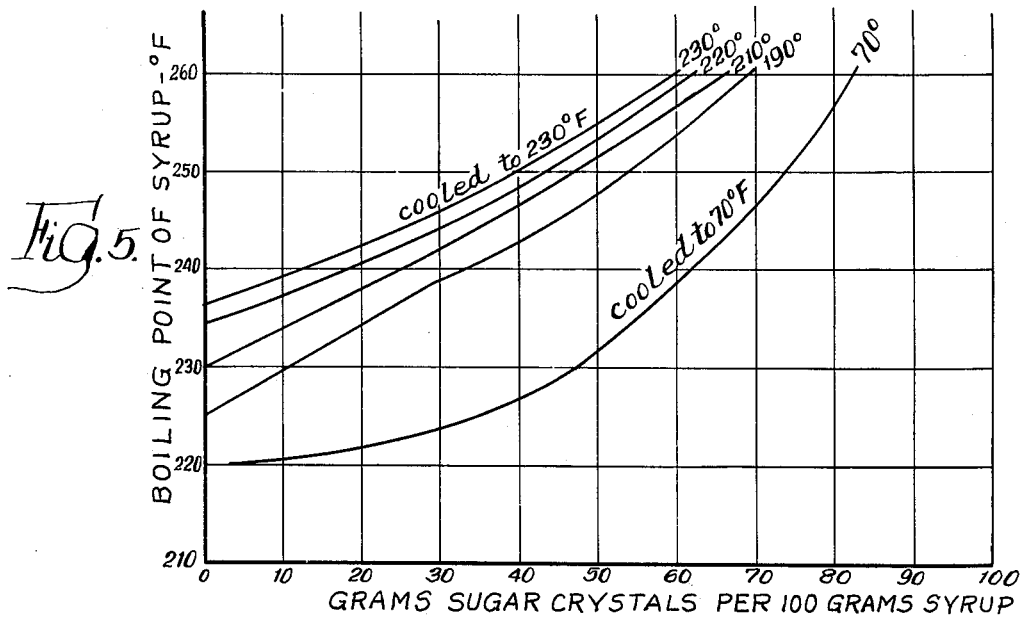
FIG. 5 is a chart showing the amount of sugar crystals in relation to the boiling point of the syrup and at various cooling temperatures.
Figure 6:
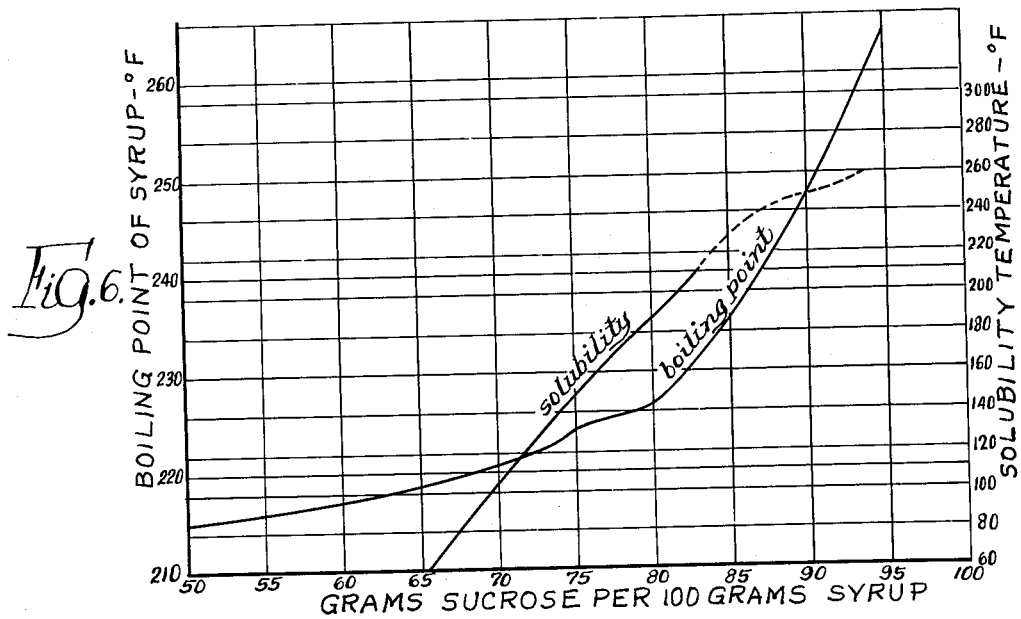
FIG. 6 is a chart showing the solubility of sucrose at various temperatures and also the amount of sucrose per 100 grams of syrup of various boiling points.
Figure 7:
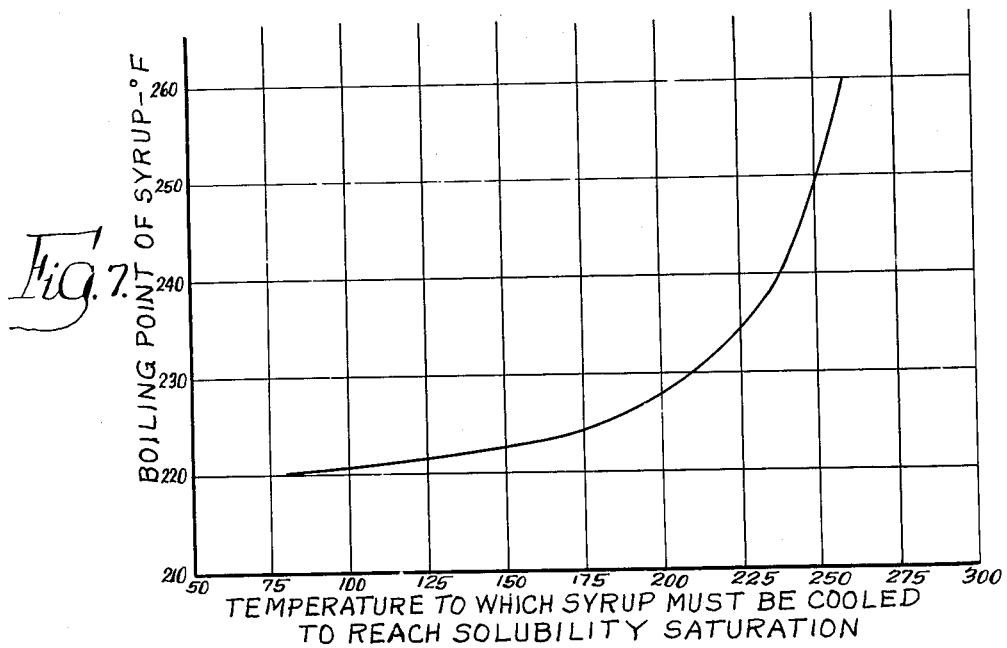
FIG. 7 is a chart showing the temperature to which syrup must be cooled to reach solubility saturation.

When crystallizing sugar syrup is added to a powdery material and mixed therewith in a certain manner, the powder particles become bound together by the sugar syrup and form pellets. The pelletizing is stopped at the stage where the particle, or pellet size, is substantially between 20 and 100 mesh. This 20 to 100 mesh pellet size is sufficiently large to be wetted when mixed with water and does not lump, as do smaller pellet or particle sizes. Larger pellets will wet on the outside but dissolve or disperse in the water too slowly.

Water alone will cause most powdery materials to pelletize, requiring an addition of about 10% to 20% water to the powder and then redrying to a level of 5% in the case of powders of medium water absorption characteristics. This type of powder will be called Type M and includes powdered skim milk and cocoa. About 20% to 30% water is required for high water absorption powders, called Type H, and includes Kraystay S. This needs redrying to about 10% water. A low water type of powder will be called Type L, and can be pelletized by about 7% to 15% added water and needs to be redried to about 3% moisture. An example of Type L powder is fumaric acid.

When water alone is used to pelletize, the surfaces of the powder itself become the adhesive and the particles form loose, low bulk density aggregates. Such particles are frequently quite fragile and break apart in shipping or handling.

When crystallizing sugar syrup is the adhesive, the syrup becomes, (a) a binder to stick the particles together during pelletizing to form a high bulk density pellet, (b) a crystalline coating material surrounding the particles, and (c) a final product where the sugar crystals serve to bind water and give a dry, free flowing powder.

By using a crystallizing sugar syrup for pelletizing, it is found that the crystallization of sugar on addition to the powder being pelletized and the final product, when cooled to room temperature, will contain a maximum amount of crystals and the crystal formation is more rapid and complete in comparison with adding a non-crystallizing sugar syrup. This is probably because most powders inhibit sugar crystallization. Thus, pre-crystallization of at least a part of the sugar in the syrup before addition to the powder to be pelletized is beneficial and a feature of this invention.

Another important feature of this invention is to provide sufficient syrup to pelletize in the 20 to 100 mesh size, but not so much as to form large pellets (dough balls) or a pasty mass which must be cooled, hardened and ground. This latter condition is undesirable inasmuch as the ground product will have particles which are not well coated with sugar crystals, involves an additional long-hardening and grinding operation and requires heavy equipment to mix the pasty material.

The syrup, at time of pelletizing, should contain sufficient moisture to accommodate the natural water absorption properties of the powder being pelletized, and supply an additional amount of water to cause pelletizing. Also, the syrup should be saturated with sugar in soluble form, which increases the effectiveness of the water as an adhesive binder, and contains at least some crystals to provide seed to allow fast crystal formation as the pelletized powder is cooled. The syrup must also be of sufficient amount to provide sufficient sugar crystals, after pelletizing and cooling, to bind the water needed to pelletize and thus yield a dry, free flowing powder.

I have found that the moisture binding power of sucrose crystals is apparently sufficient to make such bound moisture unavailable for pelletizing at the time the sugar syrup and crystals are added to the powder and, as stated above, further sugar crystal formation in the final, cooled pelletized product will bind excess moisture required for pelletizing. Sugar crystals will bind approximately 10 grams moisture per 100 grams of crystals. Thus, to determine "available" water for pelletizing and supplying water to take care of the natural water absorption properties of the powder being pelletized, for every 100 grams of crystals in the syrup at the time of pelletizing must be deducted 10 grams of water from the total water in the syrup to obtain "available" water.

Chart 5 shows the relationship between boiling point of sucrose sugar syrups and concentration of sucrose in the syrup. This chart also shows the solubility of sucrose at various temperatures. From this Chart 5 was prepared Chart 4, which shows the grams sugar crystals formed in various boiling point syrups when cooled and seeded at various pelletizing temperatures. Chart 4 also shows the grams of sugar crystals formed from the syrup when added to the powder for pelletizing and the final product cooled to 70° F.

Chart 3 shows the "available" water per 100 grams various boiling point sucrose sugar syrups when cooled to various temperatures prior to use for pelletizing. This Chart 3 takes into account the 10 grams of unavailable, or bound, water per 100 grams of crystals present in the syrup at each cooling temperature.

In my process it is desired to add sugar syrup of such sugar to water concentration, in such amounts and at such a temperature to provide to the powder being pelletized a sufficient amount of "available" water to take care of the natural water absorption properties of the powder plus approximately 5 grams water per 100 grams powder to cause pellet formation substantially in the size range of 20 to 100 mesh. Furthermore, the final product, cooled to 70° F., desirably contains sufficient sugar crystals to bind the 5 grams of available pelletizing water and yield a dry, free flowing product.

Chart 1 shows the relationship between boiling point of the syrup and amount of syrup required, when cooled to a temperature where the solubility is such that the syrup just commences to crystallize, to yield various amounts of "available" water. This chart also shows the amount of syrup, of various boiling points, to yield 50 grams or 100 grams of sugar crystals when cooled to 70° F. From this chart the minimum amount of syrup may be selected, of proper boiling point and cool (pelletizing) temperature to pelletize products under conditions represented in Table I.

The following Table I shows examples of the desired amount of "available" water required to pelletize powders of various water absorption properties.

*Table 1*

| Type powder | Examples | Rate at which pelletized | Available water req'd. for powder absorption gms. per 100 gms. powder | Available water req'd. for pelletizing gms. per 100 gms. powder | Sugar crystals required in final 70° F. product gms. per 100 gms. powder | Resulting product |
|---|---|---|---|---|---|---|
| Type H | Kraystay S | Normal | 10 | 5 | 100 | Dry. |
|  | Do | do | 10 | 5 | 50 | Med. dry. |
|  | Do | Fast | 5 | 5 | 100 | Very dry. |
|  | Do | do | 5 | 5 | 50 | Dry. |
|  | Do | Normal | 10 | 10 | 50 | Sl. wet. |
| Type M | Cocoa, milk powder. | Normal | 5 | 5 | 100 | Dry. |
|  | Do | do | 5 | 5 | 50 | Med. dry. |
|  | Do | Fast | 0 | 5 | 100 | Very dry. |
|  | Do | do | 0 | 5 | 50 | Dry. |
|  | Do | Normal | 5 | 10 | 50 | Sl. wet. |
| Type L | Fumaric acid, NaHCO₃. | Normal | 2.5 | 5 | 100 | Dry. |
|  | Do | do | 2.5 | 5 | 50 | Med. dry. |
|  | Do | Fast | 0 | 5 | 100 | Very dry. |
|  | Do | do | 0 | 5 | 50 | Dry. |
|  | Do | Normal | 2.5 | 10 | 50 | Sl. wet. |

The following examples illustrate the data available from the foregoing table.

*Example 1.*—To pelletize 100 grams cocoa (Type M) powder with a small amount of sucrose sugar syrup, using normal rate of addition of syrup to powder, yielding a final product which is "medium dry" (will be free flowing however, and generally satisfactory, although has a tendency to cake somewhat if tightly packed in packaging). This requires 10.0 grams "available" water from the syrup at time of pelletizing and the final product should have 50 grams sucrose crystals to bind the 5.0 grams of "pelletizing" water. The 100 grams cocoa will bind the remaining 5.0 grams available water to produce a sufficiently dry, free flowing product. From Chart 1 it is seen that 83 grams of a 240° F. boiling point syrup, cooled to 238° F. will meet the requirements.

*Example 2.*—To pelletize 100 grams cocoa (Type M) powder with equal parts (100 grams) sucrose sugar syrup. The 100 grams cocoa will require 5.0 grams available water to take care of its water absorptive properties and additionally 5.0 grams available water to pelletize for a total of 10.0 grams. From Chart 3 it is found that 100 grams of 240° F. boiling point syrup will furnish 10 grams available water when cooled and seeded at 200° F. before adding to the cocoa. After pelletizing and cooling to 70° F., the 100 grams of 240° F. boiling point syrup will, upon complete crystallization, furnish 61 grams sucrose crystals to the product (Chart 4). At the 200° F. temperature at which the crystallizing syrup was added to the cocoa, the syrup contained 29 grams sucrose crystals (extrapolation from Chart 4), which was taken into account in determining free moisture in Chart 3. This additional crystallization of 61-29=32 grams sucrose crystals in the final 70° F. product will bind practically all of the "pelletizing" water and the cocoa will bind the remaining water to yield a dry, free flowing product.

*Example 3.*—To pelletize 100 grams cocoa (Type M) powder with 200 grams sucrose sugar syrup. From Chart 3 it may be seen that each 100 grams of 250° F. boiling point syrup, seeded and cooled to 230° F., will furnish 5 grams "available" water for pelletizing and satisfying the water absorption demand of cocoa. Thus, 200 grams will provide the total of 10 grams available water for 100 grams cocoa. After pelletizing and cooling to 70° F., the syrup will form 146 grams sucrose crystals (Chart 4). At 230° F. the sugar syrup contains 80 grams sucrose crystals which was taken into account in Chart 3 for determining "available" water. Thus, 146-80=66 grams sucrose crystals which are available and ample to bind the "pelletizing" water of the syrup to form a dry final product.

All three of the preceding examples produced a pelletized cocoa which, when mixed with water, wetted and dropped beneath the surface without lumping and without stirring, and the pellets dissolved and completely dispersed after stirring for 30 seconds.

The bulk density of the cocoa before instantizing was .305 gram per cc. loose packed and .360 gram per cc, tamp-packed. In comparison, the pelletized cocoa had the following bulk densities:

|  | Loose packed gms./cc. | Temp-packed gms./cc. |
| --- | --- | --- |
| Example A | .555 | .610 |
| Example B | .565 | .645 |
| Example C | .640 | .672 |

It should be remembered that the amount of water spoken of as required for pelletizing, is actually considerably more effective as a binder by virtue of containing dissolved sugar. If pure water were used, the requirements would be 2 to 3 times as much to pelletize as compared with water in the form of sugar syrup. This is the reason that moisture-pelletized products require drying after pelletizing. Sugar syrup pelletized products, according to my process, do not require drying, or at the most slight drying, since the water required to pelletize is less and this water is in turn bound by the sugar crystals after pelletizing has been completed.

The rate of syrup addition to the powder to be pelletized and the efficiency of the mixing operation will somewhat alter the amount, concentration and temperature of syrup used. Thus, with fast addition of syrup the powder does not have time to absorb water and "available" water furnished by the syrup can be lessened. This condition is helpful if a very efficient, high speed mixer is used and it is desired to keep the sugar added to the powder at a minimum. However, I have found that at least 1 part sucrose to 4 parts powder is necessary to provide sufficient sucrose to coat the particles. On the other hand, very slow addition of syrup to the powder will provide time to further cool and form additional crystals in the product before pelletizing is completed, thus reducing "available" water in the syrup and either requiring a greater amount of syrup or a syrup of lower boiling point, or a syrup cooled to a higher temperature at the time of pelletizing. This may be beneficial where a large amount of sucrose is desired to be added to the powder. I have found that, in general, equal parts of sucrose to powder provides sufficient sucrose crystal coating of the powder to give it good dispersibility or solubility when stirred into water. An even higher ratio of as much as 4 parts sucrose to 1 part powder imparts characteristics of finely granulated sugar to the product and this may be desired for certain uses.

The type of mixers utilized in the examples given here have been of the general kitchen and bakery mixer type, including bakery mixers of from 100 lbs. to 3,000 lbs. batch sizes.

If the "available" moisture from the syrup is much beyond the amount necessary to satisfy the natural water absorption demands of the powder to be pelletized plus the 5 to 10 grams of mixture per 100 grams of powder necessary to pelletize, the powder-syrup mixture tends to form large dough balls, or a pasty mass, which is quite undesirable. Thus, for example, the process shown in U.S. Letters Patent No. 2,336,254 is such as to bring the mixture to a "doughy" consistency.

If the "pelletizing" moisture (that in addition to available moisture used to satisfy powder water absorption demands) is too low, below 5.0 grams per 100 grams of powder, and certainly if below 2.5 grams, the powder will not pelletize to a sufficient extent to give satisfactory results.

If the amount of crystal formation in the final product, available for binding of the pelletizing water, is too low, the product will tend to be wet, cake, and not be free flowing. I have found that 100 grams of sucrose crystals (additional crystals formed by cooling from pelletizing temperature of the syrup to 70° F.) will bind approximately 10 grams of water. If the crystals are insufficient to bind the pelletizing water, a satisfactory product can sometimes be obtained by a final drying. Such drying requirements are of lesser extent than conventional wet-redry pelletizing processes for reasons previously mentioned, and generally may be accomplished with simply relatively dry air at room temperature.

To determine the natural water absorptive power of powders to be pelletized, I have added increments of water slowly, and with mixing, to the powders and determined the point at which the powder becomes very slightly damp to the touch, and just before the powder will tend to compress and stick together when placed under pressure. Examples are cocoa, requiring 5 grams water per 100 grams powder; Kraystay S requiring 10 grams water per 100 grams; and fumaric acid requiring 2.5 grams water per 100 grams.

Chart 6 illustrates proper sucrose sugar syrup conditions for pelletizing powders when minimum amounts of syrup are desired (maximum available moisture at time of pelletizing per quantity of syrup, by utilizing barely crystallizing syrup), and yet sufficient crystals in the final product to bind the excess moisture available for pelletizing. Chart 7 is used to determine the temperature to which sucrose sugar syrup of various boiling points must be cooled to initiate crystallization.

I have found that compounds other than sucrose can be successfully used as pelletizing material for powders. These compounds should have the properties of, (a) being very soluble in water at higher temperatures, (b) crystallize at lower temperatures, and (c) impart relatively good non-hygroscopic properties to the powder. Such compounds include aluminum potassium sulfate, trisodium phosphate and dextrose.

Examples of powders which have been successfully pelletized are given as follows:

*Example 4.*—Sodium aluminum sulfate is used as a slow acid releasing compound in the presence of water and this acid reacts with sodium bicarbonate in flour mixtures to form carbon dioxide when used for baking. Difficulty has been experienced with sodium aluminum sulfate being hygroscopic, cakes, and is not free flowing. In cake mixes this property may be imparted to the cake mix itself.

250 grams sodium aluminum sulfate (finely powdered) was mixed with 200 grams sucrose in the form of a 235° F. boiling point syrup, cooled to 190° F. and seeded before mixing with the sodium aluminum sulfate. Pellets were formed, substantially all of which were in the 20 to 100 mesh size range. Upon cooling, the product was free flowing and did not cake when placed in an atmosphere of 35% relative humidity for 72 hours.

|  | Grams per 100 grams powder |
|---|---|
| Available moisture | 12.3 |
| Available crystals at 70° F. | 31 |

Above conditions give a slight excess of moisture for a Type L-M product.

*Example 5.*—A commercial stabilizer, called Kraystay S, and technically known as refined carrageen gelose, has wide usage as a thickening agent in ice cream, desserts, beverages, etc. A major difficulty has been encountered with severe lumping when Kraystay S is mixed with aqueous liquids and the resulting slow hydration of the stabilizer.

A 248° F. sugar syrup was prepared from 3.0 pounds sucrose, cooled to 190° F. and seeded. This was used to pelletize 1.0 lb. Kraystay S. The resulting product was free flowing, dispersed readily in water without lumping and hydrated quickly after dispersion.

|  | Grams per 100 grams powder |
|---|---|
| Available moisture | 16.7 |
| Available crystals at 70° F. | 60 |

Above conditions good for Type H powder.

*Example 6.*—Kraystay S (200 grams) was pelletized with 400 grams aluminum potassium sulfate, $$[AlK(SO_4)_2 \cdot 12H_2O]$$

which was made into a 95% syrup by mixing with sufficient water to dissolve and boiling off the water. The syrup was cooled to 190° F. and seeded with finely powdered aluminum potassium sulfate crystals. The crystallizing syrup was then added slowly to the mixing Kraystay S to form pellets between 20 and 100 mesh. The resulting product was free flowing and dispersed readily in water without lumping.

*Example 7.*—This was the same as Example 6 except that 91% hot aluminum potassium sulfate syrup was used in the ratio of 200 grams $AlK(SO_4)_2 \cdot 12H_2O$ to 200 grams Kraystay S. The syrup was cooled to 190° F. and seeded before addition. The resulting product was similar in nature to Example 6.

*Example 8.*—Kraystay S (200 grams) was pelletized with a 95% trisodium phosphate syrup containing 400 grams $Na_3PO_4 \cdot 12H_2O$ cooled and seeded at 190° F. The resulting product was free flowing and dispersed readily in water without lumping.

*Example 9.*—Sesame protein flour, commercially known as "Polymine-S Sesame Protein" was obtained from Food Techniques, Inc. of San Jose, California. This product is extremely difficult to wet and disperse in water and will lump and float on the surface of the water even with much stirring.

To 200 grams of sesame protein flour was added 400 grams of sucrose in the form of a 240° F. boiling point syrup, seeded and cooled to 190° F. before use as a binder. The resulting product had 20 to 100 mesh pellets which did not lump when stirred into water and dispersed readily. It also had less tendency to cake and was free flowing, compared with the non-pelletized flour.

|  | Grams per 100 grams flour |
|---|---|
| Available moisture | 19.2 |
| Available crystals at 70° F. | 62 |

Above conditions good for Type $H^+$ powder.

*Example 10. Fumaric acid, Tween 80, and dextrose syrup as binder.*—Fumaric acid has a low water solubility but this does not prevent its use, within the limits of its solubility, as an acidulant in fruit flavored drinks and beverages. However, in an effort to increase the rate of solubility in cold water, fine grinding has brought about the problem of lumping when added to water.

Although crystallizing sucrose syrup greatly reduced lumping of fumaric acid when mixed with water, dextrose was found to be better. Also, it was discovered that Tween 80 was of further aid in bringing about very rapid dispersion and complete solution of fumaric acid. Tween 80 is a well known wetting agent.

To 200 grams of finely ground (smaller than 200 mesh) fumaric acid was added 20 grams Tween 80. To this was added 200 grams dextrose in the form of a 260° F. boiling point syrup which was cooled and seeded at 180° F. before adding to the fumaric acid. The resulting product mixed into cold water without lumping, dispersed readily and dissolved very quickly.

*Example 11. Sodium bicarbonate with sucrose syrup as binder.*—Sodium bicarbonate ($NaHCO_3$) dissolves well in water without lumping but does not have good free flowing characteristics and has a tendency to cake.

200 grams of 200 mesh $NaHCO_3$ was pelletized with 150 grams of sucrose in the form of a 245° F. boiling point syrup, cooled and seeded at 195° F. After equilibrating with room temperature air for 16 hours, the final product dissolved slightly more rapidly in water and was free flowing compared with non-pelletized $NaHCO_3$.

|  | Grams per 100 grams powder |
|---|---|
| Available moisture | 7.2 |
| Available crystals at 70° F. | 22 |

Above conditions for Type L powder, left powder of slightly excess moisture, which was corrected by equilibrating with air at room temperature.

*Example 12.*—Powdered sugar has well known tendencies to cake and lump when mixed with water.

227 grams powdered sugar was pelletized with 150 grams sucrose in the form of a 230° F. boiling point syrup, cooled and seeded at 195° F. The resulting product was cooled and equilibrated by allowing to stand exposed to room temperature air for 16 hours. The pelletized sugar was free flowing, did not cake, and dissolved quickly in cold water without lumping.

|  | Grams per 100 grams powder |
|---|---|
| Available moisture | 13.2 |
| Available crystals at 70° F. | 31 |

Above conditions satisfactory for Type M-H powders when equilibrated with room temperature air.

*Example 13.*—It is possible to reduce sugar syrup to powder ratio to a minimum by the addition of a certain amount of water to the powder before mixing the powder with the syrup. Thus, the natural water absorptive properties of the powder may be fulfilled and syrup used only to fulfill the demand in becoming a binder for pelletizing and, upon cooling, furnishing sufficient crystals to provide a free flowing powder and satisfactory sugar coating of the particles.

200 grams cocoa was intimately mixed with 10 grams water. To this was added 123 grams sugar in the form of a 254° F. boiling point sugar, cooled and seeded at 252° F. and added at 252° F. The resulting product was primarily in the pellet size range of 20 to 100 mesh and dispersed in water without lumping. It was also free flowing. Dispersion was good, but not as fast as examples where a higher sugar to cocoa ratio was used.

The following additional examples of "commercial" mixes further exemplify the process:

*Example 14.*—26 lbs. cocoa, 1.5 lbs. powdered vanilla, 2 lbs. salt, 1.5 lbs. sodium citrate, 1.5 lbs. guar seed gum, and 240 lbs. skim milk powder for a total of 272.5 lbs. To this was added 300 lbs. sugar in the form of a 246° F. syrup (92.7%), or 324 lbs. syrup, cooled to 210° F.

|  | Grams per 100 grams powder |
|---|---|
| Available moisture from syrup at pelletizing temperature | 9 |
| Available (moisture binding) crystals at 70° F. | 35 |

Above conditions satisfactory for Type M powder although rate of pelletizing was fairly fast to partially overcome effects of water absorption of the powder during pelletizing, since available water from the syrup was on the low side.

*Example 15.*—4.75 lbs. salt, 3.0 lbs. sodium citrate, 495 lbs. skim milk powder, 5 lbs. strawberry flavor, and 0.1 lb. red coloring for a total of 508 lbs. To this was added 500 lbs. sugar in the form of a 246° F. boiling point syrup, or 540 lbs. syrup, cooled to 215° F.

Available moisture = 7.7 grams per 100 grams powder
+1.0 grams from strawberry flavor
———
8.7 grams Available crystals at 70° F.=34 grams per 100 grams powder Above conditions satisfactory for Type M powder. Fairly fast pelletizing was used since available water from the syrup was slightly low.

A valuable application of my process results from mixing highly hygroscopic materials such as dehydrated orange juice with crystallizing sucrose syrup to yield a product of less hygroscopic qualities and one more easily reconstituted in water without lumping.

One of the definite advantages of my invention which will be obvious to those skilled in the art, is that no complex machinery or controls are required in order to carry out the process, and relatively inexpensive equipment may be used for the production of the products.

Having described my invention as related to the embodiments set out herein, it is my intention that the invention be not limited by any of the details of description unless otherwise specified, but rather be construed broadly within its spirit and scope as set out in the accompanying claims.

I claim:

1. The method of forming pellets of a powdery material which comprises initiating crystallization of a crystallizable binder, adding the binder while it is still crystallizing to the powder, said binder having between 2.5 and 20 grams of water per 100 grams of material available after absorption of water by said material to form the material into pellets having a size between 20 and 100 mesh without forming the same into a mass having the consistency of dough.

2. The method of forming pellets of a powdery material which comprises initiating crystallization of a crystallizable binder, adding the binder while it is still crystallizing to the powder, said binder having between 5 and 10 grams of water per 100 grams of material available after absorption of water by said material to form the material into pellets having a size between 20 and 100 mesh without forming the same into a mass having the consistency of dough.

3. The method of forming pellets of a powdery material which comprises initiating crystallization of a crystallizable binder, adding the binder while it is still crystallizing to the power, said binder having between 5 and 10 grams of water per 100 grams of material available after absorption of water by said material to form the material into pellets having a size between 20 and 100 mesh without forming the same into a mass having the consistency of dough, and said binder forming sufficient crystals upon completion of crystallization to bind said available water in the pelletized material.

4. The method of forming pellets of a powdery material which comprises initiating crystallization of a crystallizable binder, adding the binder while it is still crystallizing to the powder, said binder having between 5 and 10 grams of water per 100 grams of material available after absorption of water by said material to form the material into pellets having a size between 20 and 100 mesh without forming the same into a mass having the consistency of dough, and said binder forming approximately 10 grams of crystals for each gram of available water upon completion of the crystallization to bind said available water in the pelletized material.

5. The method of claim 4 in which the binder is dextrose.

6. The method of claim 4 in which the binder is sucrose.

7. The method of claim 4 in which the binder is aluminum potassium sulfate.

8. The method of claim 4 in which the binder is trisodium phosphate.

References Cited by the Examiner

UNITED STATES PATENTS

| 2,071,841 | 2/1937 | Kelling | 99—166 X |
| 2,117,344 | 5/1938 | Middleton | 99—23 |
| 2,208,471 | 7/1940 | Penn | 99—232 |
| 2,399,195 | 4/1946 | Bodenheim | 99—23 |
| 2,430,797 | 11/1947 | Zinzes | 99—204 |
| 2,487,931 | 11/1949 | Lataner | 99—23 |
| 2,868,654 | 1/1959 | Haynes | 99—143 |
| 2,871,121 | 1/1959 | Kimura | 252—385 X |
| 2,893,871 | 7/1959 | Griffen | 99—56 |

FOREIGN PATENTS 766,889   1/1957   Great Britain.

OTHER REFERENCES

Condensed Chemical Dictionary, 1956, Reinhold Publ. 6, New York, page 52.

Silver et al., Manufacture of Compressed Tablets, 1944, publ. by J. Stokes Machine Co., Phila., Pa., pp. 8, 12 and 13.

A. LOUIS MONACELL, *Primary Examiner.*